Oct. 12, 1954     O. WITTEL     2,691,322
LENS MOUNTING DEVICE
Filed March 1, 1952
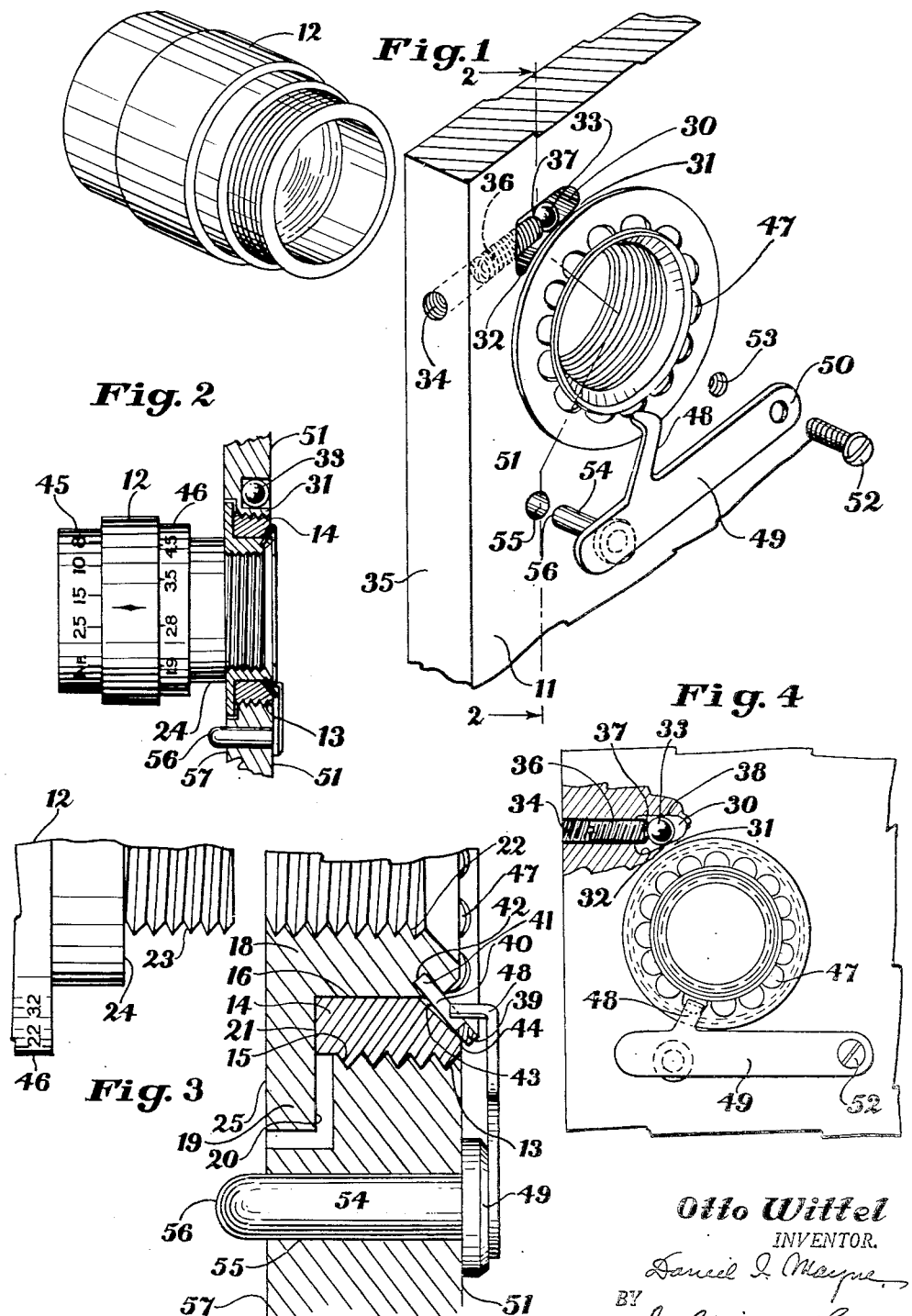

Patented Oct. 12, 1954

2,691,322

UNITED STATES PATENT OFFICE 2,691,322

LENS MOUNTING DEVICE

Otto Wittel, Rochester, N. Y., assignor to Eastman Kodak Company, Rochester, N. Y., a corporation of New Jersey Application March 1, 1952, Serial No. 274,404

10 Claims. (Cl. 88—57)

The present invention relates to a lens mounting device, and more particularly to a device which holds the mounting parts in proper axial relation, yet permits relative rotation of the parts to orient or adjust the lens mount to position the scales in proper viewing position.

As is well known, the lens elements are usually positioned in a definite relation in a cylindrical tube member or mount, which is usually threaded so that it may be screwed into the camera front or suitable support. In screwing the lens mount to the camera, means must be provided to position the mount axially so that the image formed by the lens system will be brought to a sharp focus at the image or film plane, which is commonly known as the focal plane. It has been found, however, that when the mount has been screwed into the camera and properly positioned axially so as to position the parts in proper focus, that the mount is not properly oriented so that the various scales are in position for convenient viewing by the operator. In order to overcome this difficulty, many forms of lens mounting devices provide arrangements whereby the lens mount alone or the lens mount and some associated parts may be rotated relative to other parts to turn or orient the lens mount to bring the scales into proper viewing position without in any way altering the axial position of the lens mount.

The principal object of the present invention is the provision of a new and improved mounting means for a tubular lens mount.

Yet another object of the invention is the provision of a unique arrangement for clamping or locking the mounting means in proper axial position on the camera front or support.

Still another object of the invention is the provision of a novel means which assures proper axial relation of the mounting parts, yet permits free and easy relative rotation to orient the lens mount to position the scales thereon in a desired position.

And another object of the invention is the provision of a mounting means which permits rotational adjustment of the parts to orient the mount after the parts have been axially positioned and locked to the camera or support.

And a further object of the invention is the provision of a lens mounting device which is composed of few parts of rugged construction, easy to operate and highly effective in use.

To these and other ends the invention resides in certain improvements and combinations of parts, all as will be hereinafter more fully described, the novel features being pointed out in the claims at the end of the specification.

In the drawings:

Fig. 1 is a rear perspective view of a camera front or support, showing the relation thereto of a mounting device constructed in accordance with the present invention, the lens mount being detached and the locking means being disconnected and moved away from the support, better to show the relation of the parts.

Fig. 2 is a vertical sectional view taken through the support and the mounting device and substantially on line 2—2 of Fig. 1, showing the means for locking and positioning the mounting parts;

Fig. 3 is a view of the bottom portion of the mounting parts illustrated in Fig. 2, but on a larger scale than the latter and with the lens mount detached, and showing the dished ring or element for holding the mounting rings in axial relation, yet permitting relative rotation movement between the rings for the purpose of orienting the lens mount;

Fig. 4 is a rear view of the support and the mounting parts, showing the relation of the parts and the locking means carried by the support.

Similar reference numerals throughout the various views indicate the same parts.

The drawings show a camera front or support 11 on which a lens mount, generally indicated by the numeral 12, is adapted to be mounted or positioned in proper axial relation so that the image formed by the lens system will be brought to a sharp focus at the image or focal plane. As the mount, per se, forms no part of the present invention and may be of any standard or well-known construction, further details are not deemed necessary. The support 11 is formed with a threaded aperture 13 adapted to receive the mounting parts to be later described.

The mounting device comprises, in the present embodiment, an outer ring member 14, the outer periphery of which is threaded at 15 to engage in threaded relation with the threads in the aperture 13 to connect the ring 14 to the camera front or support 11. The member 14 is formed with a central smooth bore or aperture 16 which is concentric with surface 15 and is adapted slidably to receive the outer surface of an inner ring or member 18. The latter is formed with an annular radially extending flange 19, the rear face 20 of which abuts and is held in engaging relation with the front face 21 of the ring 14 to position rings 14 and 18 in proper axial relation, as will be later more fully described. The faces 20 and 21 thus form cooperating shoulders which serve to position the rings 14 and 18 in proper relative axial relation. In addition, the inner ring 18 is formed with a central threaded opening or bore 22 which is concentric with 15 and 16 and is adapted to receive a threaded portion 23 of the lens mount 12. The latter is formed with a radial shoulder 24 positioned at the inner end of the portion 23, as best shown in Fig. 3.

When the parts are to be assembled, the inner ring 18 is slid into the outer ring 14 until the surfaces or faces 20 and 21 are brought into abutting engagement. The portion 23 of the lens mount is then screwed into the inner ring 18 until the shoulder 24 is brought into tight, abutting relation with the front face 25 of the flange 19 thus to position the mount 12 axially relative to the rings 14 and 18. The assembly is then screwed into the support 11 by engaging the threaded periphery 15 of the outer ring 14 with the threaded aperture 13 of the support 11. The parts are screwed into the support until the image formed by the lens system is brought to a sharp focus on the image or focal plane. At that time, the face 25 is spaced a definite axial distance from the focal plane, and thus, through the flange or shoulder 24, accurately positions the mount 12 axially relative to support 11. The face 25 may, therefore, be broadly considered as a positioning means for mount 12.

After the parts have been screwed into position in the support, means must be provided to hold or retain the parts in proper focused relation. To secure this result, the present invention provides means for clamping or locking the outer ring 14 in adjusted position on the support 11. To this end the support is formed with an aperture or recess 30 positioned adjacent the aperture 13 thereof and separated therefrom by a thin inclined deformable wall portion 31. A ball 33 is positioned in the recess 30, and rests on the inclined upper surface 32 of the wall 31. A threaded opening 34 communicates with the recess 30, and extends outwardly to the outer edge 35 of wall 11 as shown in Figs. 1 and 4. A set screw 36 is threadedly received in opening 34 and has the inner end 37 positioned in contact with ball 33. After the parts have been screwed in the support 11, as above described, the set screw 36 is screwed in against the ball 33. As the inward movement of the screw 36 is continued, the ball 33 is wedged between the upper surface 38 and the lower inclined surface 32 of the recess 30. Such wedging serves to deflect, bend or deform the thin wall section or portion 31 to cause the adjacent threads of the aperture 13 to clamp and lock with the cooperating threads on the outer surface 15 of ring 14 to lock or clamp the latter against both axial and rotative movement to retain the ring 14 in its adjusted position on the support 11.

It will be apparent that with the structure so far described, after the outer ring 14 is locked, the inner ring 18, due to its sliding connection with the outer ring 14, may be moved freely, axially and rotatably relative to the ring 14. However, in order to assure proper positioning of the lens mount 12, it is imperative that the axial position of the ring 18 be maintained with the surface 25 a definite distance from the focal or image plane. In this position, the parts will be in the relation illustrated in Figs. 2 and 3 with the surfaces 20 and 21 in engagement. In order to retain the axial position of the inner ring 18, the present invention provides yieldable connecting means between the rings 14 and 18 which serves to retain the rings in proper axial relation, yet permits relative rotation of the rings to allow orientation of the lens mount, as will be later more fully described.

To this end, the present invention provides a yieldable connecting member which is formed from an annular piece of spring or resilient material, such as spring steel, to provide a peripheral ring portion 39 which lies substantially in a single plane and an inwardly extending inclined or dished portion 40. The inner edge 41 of portion 40 registers with extends into and tightly engages in a peripheral slot or notch 42 formed on the outer surface of the inner ring 18 at the end thereof opposite the flange 19 as best shown in Fig. 4. In order that the inner edge 41 may be engaged in the slot 42, the surface of the opening 16 adjacent slot 42 is cut away to provide clearance, as shown at 43, Fig. 3. Thus, the dished member is carried by and is adapted to rotate, in a manner to be later described, as a unit with the inner ring 18. The planar portion 39 of the dished member, on the other hand, engages the rear surface 44 of the outer ring 14, as clearly illustrated in Fig. 3. Thus, the dished member yieldably connects the rings 14 and 18, and tends to move or slide the latter axially or to the right, as viewed in Figs. 2 and 3, to maintain the surfaces 20 and 21 in engagement and to position the surface 25, and, hence the lens mount 12, accurately in an axial direction so as to maintain the image formed by the lens system at the focal plane, the advantages of which are deemed apparent.

It is sometimes found, however, that after the mounting parts have been screwed into position and adjusted relative to the support so that the parts are in proper axial relation, the scales 45 and 46 on the lens mount 12 may not be properly orientated or positioned so that they are easily and readily viewable by the operator, the disadvantages of which are readily apparent. In order to bring the mount 12 into proper orientation, the mount must be rotated relative to support 11, as is apparent. This rotation of the mount may, however, be adjusted by merely rotating the mount relative to the adjusting rings 14 or 18. However, with such an adjustment, the shoulder 24 of the mount will be moved out of engagement with the front face 25 of the flange 19, and the desired axial relation of the mount will be destroyed. In order to overcome this difficulty, the structure of the present invention permits the inner ring 18 and the lens mount 12 to be rotated as a unit relative to the outer ring 14, but without altering the axial relation of the two rings or the mount, so that during this orientation the axial position of the parts is not destroyed and the image will be maintained in focus. During such rotation the dished member rotates with the inner ring 18, and the portion 39 slides on the surface 44 of ring 14 so as always to maintain the surfaces 20 and 21 in contact and the rings in proper axial relation.

Such relative rotation of the rings enables the operator to position the scales 45 and 46 in the desired position without altering the focusing adjustment of the parts. However, after such rotatable adjustment is made, means must be provided for locking the mount in its adjusted position so as to prevent accidental turning of the mount. A variety of means may be employed to secure this result. However, in the preferred embodiment this result is secured by means which engages and holds the dished member against rotation. It is apparent that as the dished member is connected to the inner ring 18 which, in turn, is connected to the mount, the dished member is held against rotation and both the inner ring and lens mount are so held and locked against rotation relative to the outer ring 14.

To this end, the inclined portion 40 of the dished member is provided with a plurality of annularly arranged recesses or apertures 47 in which a lug or pawl 48 is adapted to be received to lock the dished member, and hence the ring 18 and the mount 12, against rotation relative to the ring 14. The pawl 48 is formed integral with and is positioned near one end of a strip or bar 49 of spring material, such as metal. The end 50 of bar 49, remote from the lug 48, is anchored to the rear surface 51 of the support 11 by means of a screw 52 which extends into a registering threaded opening 53 in the support 11. The bar 49 thus constitutes a spring cantilever member which is anchored only at one end by screw 52. The other end of the bar is provided with a forward extending pin 54 which extends through a registering opening 55 in support 11, and terminates in a finger piece 56 which is spaced slightly away from the front surface 57 of support 11, as best shown in Figs. 2 and 3. With the parts in the position shown in Figs. 2 and 3, pawl 48 is engaged in one of the apertures 47 of the dished member, and the inner ring 18 and lens mount 11 are locked against relative rotation to the outer ring 14 which, in turn, is locked in relation to the support 11. Now, when the lens mount and assembly have been screwed into the support 11 to a position to bring the image into sharp focus at the focal plane, the set screw 36 is screwed in to cause the ball 33 to deform wall 31 to clamp and lock rings 14 and 18, and hence mount 12 in proper axial and focused relation. However, at this time it may be found that the lens mount is not properly oriented and the scales 45 and 46 are not in the desired position.

In order to bring the scales 45 and 46 in proper relation, the finger piece 56 is grasped and pushed inwardly. Such action causes the bar 49 to flex or pivot about screw 52 to withdraw lug or pawl 48 out of the registering recess 47. Such withdrawal serves to free the dished member and the inner ring 18. These members may now be rotated as a unit, with the lens mount to adjust the latter relative to the clamped ring 14 to bring the scales into proper position. During this adjustment, the dished member is carried as a unit with the inner ring 18 and the planar portion 39 rides on the rear surface 44 of the outer ring 14, and thus yieldably retains the parts in proper axial adjustment during the rotative movement. After the lens mount has been rotated sufficiently to bring the scales 45 and 46 in proper position, the finger piece 56 is released. The bar 49, due to its spring nature, then moves the entire bar forward to shift the lug 48 into a registering but different aperture 47 of the portion 40 of the dished member again to lock the rings 14 and 15, and hence the lens mount, in non-rotative relation on the support 11.

Thus, the parts may be adjusted axially to properly focus the image. Then, after the image is focused, the lens mount and certain parts of the mounting means may be rotated as a unit relative to other parts which are clamped to the support to permit the mount to be adjusted or oriented to bring the scales into proper viewing position. However, during this rotating or orienting adjustment, the parts are always maintained in their previously adjusted axial or focused relation. Thus, two movements are provided for the inner ring 18 (1) an axial movement with the outer ring to position the parts in proper focal adjustment, after which the outer ring is clamped; and (2) a rotative movement relative to the outer ring 14 to orient the lens mount 12 to bring the scales 45 and 46 into proper position while maintaining the parts in their proper axial or focused relation. Thus, during the orientation of the lens mount, the focusing adjustment is in no way altered.

The present invention thus provides a mounting device which not only permits proper focusing of the image, but also the rotation or orientation of the lens mount to position the scales thereon without changing or altering the focusing adjustment. After the rotating adjustment of the lens mount has been made, the parts are then locked against both axial and rotative movement so as to insure the retention of the proper adjustment of the parts. The mounting device of the present invention comprises few parts of rugged construction, is easy to operate and highly effective in use.

While one embodiment of the invention has been disclosed, it is to be understood that the inventive idea may be carried out in a number of ways. Therefore, this invention is not to be limited to the precise details described, but is intended to cover all variations and modifications which fall within the scope of the appended claims.

What I claim and desire to secure by Letters Patent of the United States is:

1. In a lens mounting, the combination with a support formed with a threaded aperture, of a ring threadably engaging said aperture, a second ring slidably positioned in said first ring and formed with a threaded aperture adapted to receive a lens mount, a mount positioning surface formed on said second ring, means for clamping said first ring in fixed position in said support, means to position said second ring axially relative to said first ring, and a releasable means connecting the rings to retain the rings in assembled relation, but permitting the second ring and said mount to be rotated relative to said first ring.

2. In a lens mounting, the combination with a support formed with a threaded aperture, of a ring threadably engaging said aperture, a second ring slidably positioned in said first ring and formed with a threaded aperture adapted to receive a lens mount, a mount positioning surface formed on said second ring, means for clamping said first ring in a fixed position in said support, means to position said second ring axially relative to said first ring, a dished annular element carried by said second ring and engaging said first ring to retain the rings in assembled relation, means on said support engaging said element to prevent relative rotation of the rings, and means to render said engaging means inoperative to permit said second ring and said mount to be rotated relative to said first ring.

3. In a lens mounting, the combination with a support formed with a threaded aperture, of a ring threadably engaging said aperture, a second ring slidably positioned in said first ring and formed with a threaded aperture adapted to receive a lens mount, a mount positioning surface formed on said second ring, means for clamping said first ring in a fixed position in said support, means to position said second ring axially relative to said first ring, a dished annular element carried by and movable as a unit with the second ring and engaging the first ring to retain the rings in assembled relation, said element being formed with a plurality of recesses, a spring pressed lug adapted to engage in one of said recesses to prevent relative rotation of the rings, and means to move said lug to a disengaged position to permit said element, mount and second ring to be rotated as a unit relative to said first ring.

4. In a lens mounting, the combination with a support formed with a threaded aperture, of a ring threadably engaging said aperture, a second ring slidably positioned in said first ring and formed with a threaded aperture adapted to receive a lens mount, a mount positioning surface formed on said second ring, means for clamping said first ring in fixed position in said support, means to position said second ring axially relative to said first ring, means yieldably connecting the rings to hold said rings in proper axial relation, said connecting means being rotatable as a unit with said second ring to orient said mount, ring holding means carried by said support and engaging said connecting means to lock the rings against relative rotation, and means to release said holding means to free said connecting means to permit said second ring to be rotated on said support relative to said first ring to orient said mount.

5. In a lens mounting, the combination with a support formed with a threaded aperture, of a ring threadably engaging said aperture, a second ring slidably positioned in said first ring and formed with a threaded aperture adapted to receive a lens mount, a mount positioning surface formed on said second ring, means for clamping said first ring in fixed position in said support to position said second ring axially relative to said first ring, said second ring being formed with an annular groove, an element formed to provide an annular planar section and a dished section, said element being positioned with said dished section engaging in said groove and said planar section in engagement with said first ring to provide a resilient connection between the rings to retain the rings in proper axial relation but permitting relative rotation of the rings, means carried by said support and cooperating with said element to lock the rings against relative rotation, and means for disconnecting said last means from said element to free the latter to permit said second ring, mount and element to be rotated as a unit relative to said first ring.

6. In a lens mounting, the combination with a support formed with a threaded aperture, of a ring threadably engaging said aperture, a second ring slidably positioned in said first ring and formed with a threaded aperture adapted to receive a lens mount, a mount positioning surface formed on said second ring, said support being formed with a deformable wall positioned adjacent said first aperture, means to deform said wall to clamp said first ring in fixed position in said first aperture, means to position said second ring axially relative to said first ring, and a releasable means connecting the rings to retain said rings in assembled relation, but permitting said second ring and said mount to be rotated relative to said first ring.

7. In a lens mounting, the combination with a support formed with a threaded aperture, of a ring threadably engaging said aperture, a second ring slidably positioned in said first ring and formed with a threaded aperture adapted to receive a lens mount, a mount positioning surface formed on said second ring, said support being formed with a deformable wall portion positioned adjacent said first aperture, a ball positioned on said support and in engagement with said wall portion, means for pressing said ball against said wall portion to move the latter into clamping relation with said first ring to lock the latter against movement relative to said support, means to position said second ring axially relative to said first ring, and a releasable means connecting the rings to retain the rings in assembled relation, but permitting said second ring and said mount to be rotated relative to said first ring.

8. In a lens mounting, the combination with a support formed with a threaded aperture, of a ring threadably engaging said aperture, a second ring slidably positioned in said first ring and formed with a threaded aperture adapted to receive a lens mount, a mount positioning surface formed on said second ring, said support being formed with a recess separated from said first aperture by a thin deformable wall portion, a ball positioned in said recess, threadable means for moving said ball against said wall portion to deform the latter to clamp said first ring in fixed relation on said support, means both to connect the rings and to position said second ring axially relative to said first ring, means engaging said last-mentioned means to lock the rings against relative rotation, and means for releasing said locking means to free said connecting means to permit said second ring to be rotated relative to said first ring to orient said mount.

9. In a lens mounting, the combination with a support formed with a threaded aperture, of a ring threadably engaging said aperture, a second ring slidably positioned in said first ring and formed with a threaded aperture adapted to receive a lens mount, a mount positioning surface formed on said second ring, said support being formed with a recess separated from said first aperture by a thin deformable wall portion, a ball positioned in said recess, threadable means for moving said ball against said wall portion to deform the latter to clamp said first ring in fixed relation on said support, cooperating shoulders formed on the rings, a yieldable member connecting the rings to hold said shoulders in engaging relation to position the rings in proper relative axial relation, means carried by said support and engaging said yieldable member to lock the rings against relative rotation, and means for releasing the locking means to free said second ring so that the latter may be rotated relative to said first ring to orient said mount relative to said support.

10. In a lens mounting, the combination with a support formed with a threaded aperture, of a ring threadably engaging said aperture, a second ring slidably positioned in said first ring and formed with a threaded aperture adapted to receive a lens mount, a mount positioning surface formed on said second ring, said support being formed with a recess separated from said first aperture by a thin deformable wall portion, a ball positioned in said recess, threadable means for moving said ball against said wall portion to deform the latter to clamp said first ring in fixed relation on said support, cooperating shoulders formed on the rings, said second ring being formed with an annular peripheral groove on the end thereof opposite said shoulders, a dished shaped annular element having a planar section in engagement with said first ring and the free end of a dished portion positioned in said groove to hold said shoulders in engagement to maintain the relative axial positions of the rings and to connect said rings yieldably, a movable lug mounted on said support, means on said element engageable by said lug to lock said element and second ring against rotative movement relative to said first ring, and means on said support for releasing said lug to free said element so that the latter and said second ring may be rotated relative to said first ring to orient said mount relative to said support.

References Cited in the file of this patent

UNITED STATES PATENTS

| Number | Name | Date |
|---|---|---|
| 2,110,477 | Wittel | Mar. 8, 1938 |
| 2,203,660 | Young | June 4, 1940 |
| 2,287,468 | Cisski | June 23, 1942 |
| 2,293,592 | Cisski | Aug. 18, 1942 |
| 2,500,050 | Wittel | Mar. 7, 1950 |
| 2,503,750 | Lee | Apr. 11, 1950 |